(12) United States Patent
Ladouceur et al.

(10) Patent No.: US 8,331,999 B2
(45) Date of Patent: Dec. 11, 2012

(54) MOVING CONTROL BAR FOR A FLIP-STYLE WIRELESS COMMUNICATIONS DEVICE

(75) Inventors: Norman Miner Ladouceur, Waterloo (CA); Griffin Jason Tyler, Waterloo (CA)

(73) Assignee: Research In Motion Limited, Waterloo (CA)

( * ) Notice: Subject to any disclaimer, the term of this patent is extended or adjusted under 35 U.S.C. 154(b) by 755 days.

(21) Appl. No.: 12/500,699

(22) Filed: Jul. 10, 2009

(65) Prior Publication Data

US 2011/0009174 A1 Jan. 13, 2011

(51) Int. Cl.
*H04W 4/00* (2009.01)
*H04M 1/02* (2006.01)

(52) U.S. Cl. ................... 455/575.3; 455/575.4
(58) Field of Classification Search ............... 455/575.3
See application file for complete search history.

(56) References Cited

U.S. PATENT DOCUMENTS

| | | | | |
|---|---|---|---|---|
| 7,158,817 B2 * | 1/2007 | Kubo | ........................ | 455/575.3 |
| 7,848,786 B2 * | 12/2010 | Liu et al. | ..................... | 455/575.3 |
| 2005/0043056 A1 * | 2/2005 | Boesen | ....................... | 455/575.3 |
| 2006/0105824 A1 * | 5/2006 | Kim et al. | .................. | 455/575.3 |
| 2008/0032637 A1 | 2/2008 | Ladouceur et al. | | |
| 2009/0051658 A1 * | 2/2009 | Frohlund | ....................... | 345/169 |
| 2010/0041448 A1 * | 2/2010 | Gaddy et al. | ............... | 455/575.3 |
| 2010/0061054 A1 * | 3/2010 | Ladouceur et al. | ...... | 361/679.56 |

FOREIGN PATENT DOCUMENTS

| | | | |
|---|---|---|---|
| EP | 1 713 236 A | 10/2006 | |
| GB | 2 266 360 A | 10/1993 | |

OTHER PUBLICATIONS

EESR, corresponding EP application No. 09165203.2 dated Dec. 15, 2009.
Examination Report—EP09165203.2, Feb. 16, 2011, 5 pages.

* cited by examiner

*Primary Examiner* — Jean Gelin
*Assistant Examiner* — Tangela T. Chambers
(74) *Attorney, Agent, or Firm* — Rideout and Maybee LLP

(57) ABSTRACT

A wireless handheld device is provided comprising a lid, a lower casing, and a slideable control bar. The lower casing has a bottom end and a top end. The lid has a bottom end and a top end. The top end of the lid is rotatably coupled to the top end of the lower casing with at least one hinge component such that the handheld device is rotatable from a closed position to an open position and from the open position to the closed position. The lid and the lower casing have adjacent facing surfaces when in the closed position. The slideable control bar is provided on the lower casing. When the wireless handheld device is opened, the slideable control bar is slideable along the facing surface of the lower casing towards the top end of the lower casing.

18 Claims, 14 Drawing Sheets

MOVING CONTROL BAR FOR A FLIP-STYLE WIRELESS COMMUNICATIONS DEVICE

TECHNICAL FIELD

The present disclosure relates generally to mobile communication devices, and more particularly to a moving control bar for a flip-style wireless communications device.

BACKGROUND

Clamshell or flip-style mobile communication devices generally have a base and a hinged or sliding lid that can be closed over the base. These devices limit the amount of physical real estate available for providing navigation control buttons when the device is in the closed state because the device housing typically protects and covers the user interface area including such control buttons when the device is in the closed state. Some devices provide fixed, non-reusable keys accessible to the user when the device is in the closed position. These keys are typically difficult to use when the device is in the open position.

These cumbersome configurations can have an undesirable effect, such as inadvertent loss of information that the user did not intend when the user cannot open or close the device quickly enough to access the keys of interest, such as not being able to answer a telephone call before the ring ends. Further, the device must process the redundant data entry operation that inevitably follows the inability of a user to access the keys of interest resulting in incorrect key presses, which needlessly uses up computing resources on the device, such as processing and battery power.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

In some aspects there is provided a wireless handheld device comprising a lid, a lower casing, and a slideable control bar. The lower casing has a bottom end and a top end. The lid has a bottom end and a top end. The top end of the lid is rotatably coupled to the top end of the lower casing with at least one hinge component such that the handheld device is rotatable from a closed position to an open position and from the open position to the closed position. The lid and the lower casing have adjacent facing surfaces when in the closed position. The slideable control bar is provided on the lower casing. When the wireless handheld device is opened, the slideable control bar is slideable along the facing surface of the lower casing towards the top end of the lower casing.

In some aspects there is provided a wireless handheld device comprising a lower casing having a bottom end and a top end, a lid, and a slideable control bar. The lid has a bottom end and a top end. The top end of the lid is rotatably coupled to the top end of the lower casing with at least one hinge component such that the handheld device is rotatable from a closed position to an open position and from the open position to the closed position. The lid and the lower casing have adjacent facing surfaces when in the closed position. The slideable control bar resides adjacent the bottom end of the lid and the bottom end of the lower casing when in the closed position. When the wireless handheld device is opened, the slideable control bar is slideable along one of the facing surface of the lower casing towards the top end of the lower casing and the facing surface of the lid towards the top end of the lid.

Figure 1:
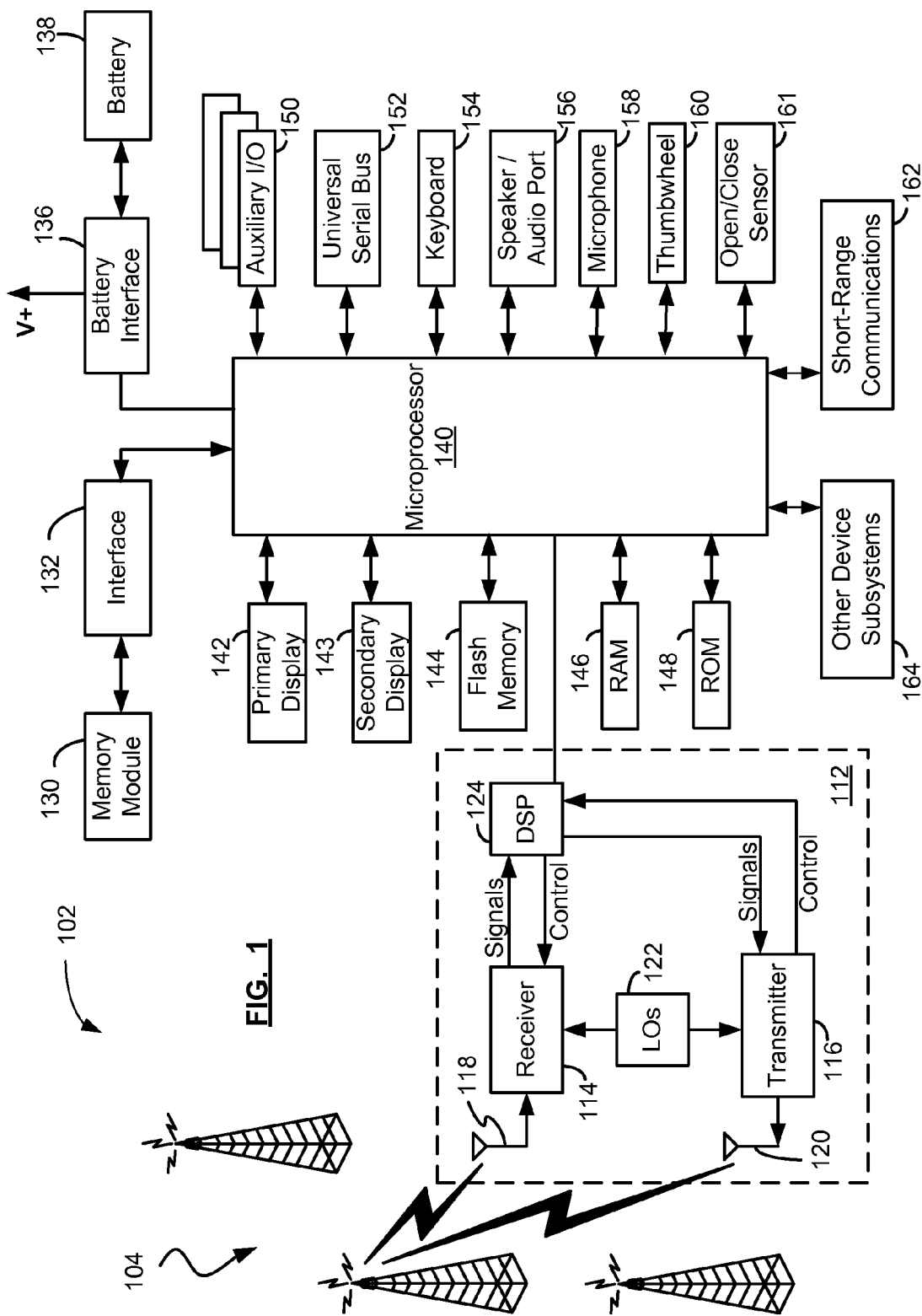
FIG. 1 shows in block diagram form a wireless device suitable for having a system in accordance with an embodiment.

Reference is first made to FIG. 1, which shows a block diagram illustrating a wireless device 102 suitable for having a moving control bar in accordance with one aspect of the present disclosure. It will be understood that references to a wireless device in this disclosure may also refer to a clamshell or flip-style wireless handheld device or to a clamshell or flip-style mobile communication device. The teachings of this disclosure may be applicable to any wireless device having a moveable or removable cover that covers the main display and/or keypad, and is not limited to clamshell devices. Therefore, when the present description and claims refer to a flip-style mobile communication device or clamshell wireless device, the intent is to include any mobile communication device that has a main body portion or lower casing with a moveable or removable cover portion or lid. An example of such a wireless device having a lower casing and lid is discussed below in connection with FIGS. 4A and 4B, and is shown in detail in respect of FIGS. 5-9. The wireless communication device 102 is intended to include, but not be limited to, a wireless device having a lower casing where a lid slides over the lower casing from a first position to a second position, a wireless device having a lower casing where a lid is attached to the lower casing with a hinge mechanism, a wireless device having a lower casing where a lid is rotatably connected to the lower casing, and combinations thereof. For example, some wireless devices have a lower casing with a lid, where the lid slides off of the lower casing to a raised position and the lid is then configured to rotate in this raised position.

The wireless device 102 communicates through a wireless communication network 104. The wireless network 104 includes antennae, base stations, and supporting radio equipment as for supporting wireless communications between the wireless device 102 and other devices connected to wireless network 104. The wireless network 104 may be coupled to a wireless network gateway 210 and to a wide area network 228, shown in FIG. 2.

In an embodiment, the wireless device 102 is a two-way mobile communication device having at least voice and data communication capabilities, including the capability to communicate with other computer systems. In an embodiment, the wireless device 102 is a clamshell handheld device. Depending on the functionality provided by the wireless device 102, it may be referred to as a data messaging device, a two-way pager, a cellular telephone with data messaging capabilities, a wireless Internet appliance, a mobile communication device (with or without telephony capabilities), a wireless handheld device, a clamshell device, or a flip-phone. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In an embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a primary display 142, an optional secondary display 143, a flash memory 144, a random access memory (RAM) 146, a read-only memory (ROM) 148, auxiliary input/output (I/O) subsystems 150, a data port such as Universal Serial Bus (USB) port 152, a keyboard or keypad 154, a speaker or audio port 156 for connecting to, for example a set of headphones or an earpiece, a microphone 158, a navigation input device 160 (e.g., a clickable thumbwheel, scroll ball, track ball, or thumbwheel), an open/close sensor 161, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the primary display 142, the secondary display 143, and the clickable thumbwheel 160, for example, may be used for both communication-related functions, such as displaying notifications or entering a text message for transmission over the wireless network 104, and executing device-resident functions such as a clock, a calculator or a task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. In an embodiment, PIM and/or media data items are seamlessly combined, synchronized, and updated via the wireless network 104, with the wireless device user's corresponding data items stored and/or associated with a host computer system thereby creating a mirrored or partially mirrored host computer on the wireless device 102 with respect to such items. This may be advantageous where the host computer system is the wireless device user's office computer system. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the primary display 142, secondary display 143, or alternatively to the auxiliary I/O device 150. A user of the wireless device 102 may also compose data items, such as email messages, for example, using the keypad 154 and/or the clickable thumbwheel 160 in conjunction with the primary display 142 and possibly the auxiliary I/O device 150. The keypad 154 may either be a complete alphanumeric keypad, a reduced keypad, or telephone-type keypad. These composed items may be transmitted through the communication subsystem 112 over the wireless network 104 or via the short range communication subsystem 162.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the primary display 142 or the secondary display 143 may also be used to provide an indication of the identity of a calling party, duration of a voice call, or other voice call related information. Stereo headphones or an earpiece may also be used in place of the speaker 156. Additionally, a wireless speaker/microphone device such as a Bluetooth headset may be used with the wireless device 102.

The USB port 152 is normally implemented in a personal digital assistant (PDA) type communication device for which synchronization with a user's computer is a desirable, albeit optional, component. The USB port 152 enables a user to set preferences through an external device or software application and extends the capabilities of the wireless device 102 by providing for information or software downloads to the wireless device 102 other than through the wireless network 104. The alternate download path may, for example, be used to load software or data files onto the wireless device 102 through a direct, reliable and trusted connection.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth is a registered trademark of Bluetooth SIG, Inc.). In another embodiment, the short-range communications subsystem 162 may be a wireless networking communications subsystem, conforming to IEEE 802.11 standards such as one or more of 802.11b, 802.11g, and/or 802.11n.

Figure 2:
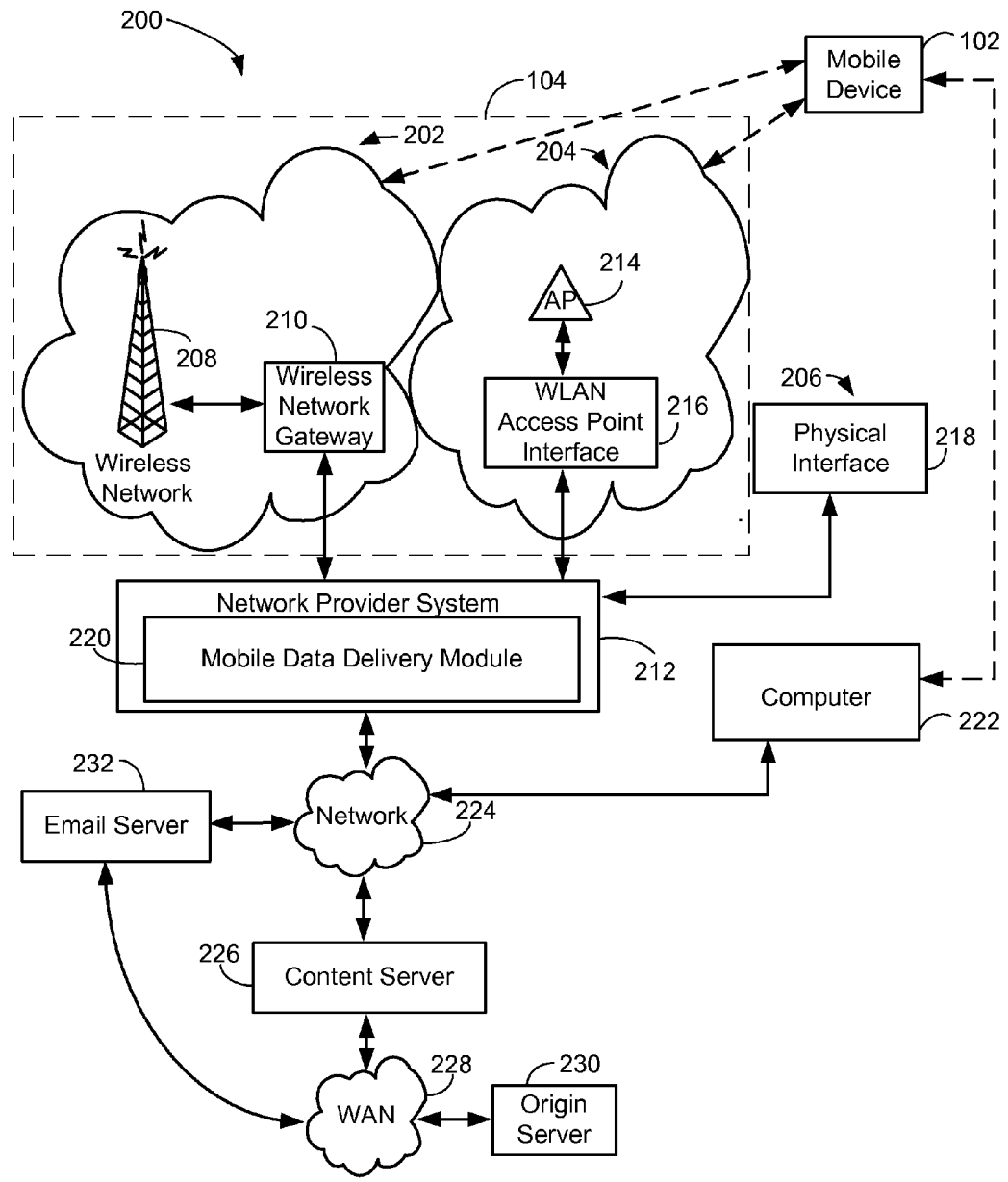
FIG. 2 shows in block diagram form a communication system suitable for providing the operating environment of the wireless device of FIG. 1 in accordance with an embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Evolution-Data Optimized (EV-DO), 3G, or 4G.

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as one or more of 802.11b, 802.11g, or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to an embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In an embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 can be temporarily and directly connected to the computer 222 using, for example, the USB port 152. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to an embodiment, the mobile data delivery module 220 provides connectivity between the wireless WAN 202 and the WLAN 204 and the other connection 206 and devices and/or networks connected directly or indirectly to the network provider system 212. In an embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
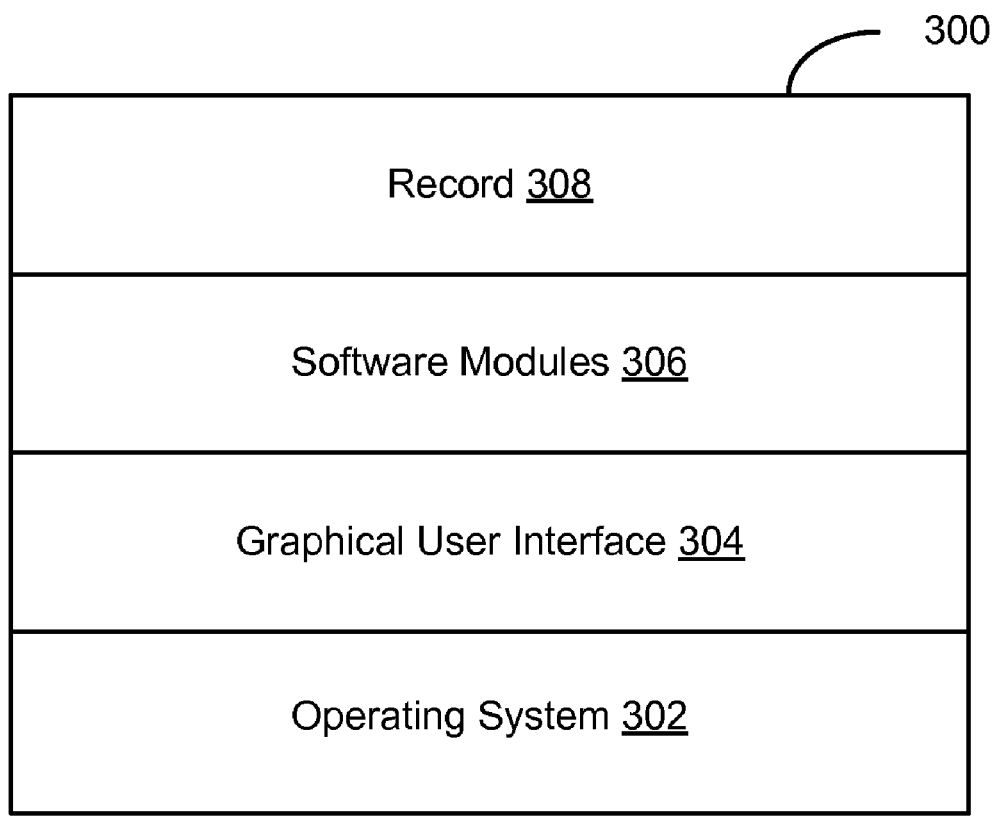
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with an embodiment, the wireless device 102 is intended to be a multi-tasking clamshell mobile communication device for sending and receiving data items, such as instant messages, for making and receiving voice calls, and for creating calendar events and alerts. To provide a user-friendly environment to control the operation of the wireless device 102, an operating system (OS) 302 resident on the wireless device 102 provides a basic set of operations for supporting various applications typically operable through a graphical user interface (GUI) 304, which may include a secondary GUI (not shown) for display on the optional secondary display 143.

The operating system 302 provides basic input/output system features to obtain input from the auxiliary I/O 150, the keypad 154, the clickable thumbwheel 160, the open/close sensor 161, and other input devices, and to facilitate output to the user via at least one of the primary display 142 and the secondary display 143. The GUI 304 is typically a component of the operating system 302. One or more software modules 306 for managing communications or providing a personal digital assistant (PDA) or other functions may also be included. The memory 300 may include a record 308 for saving of data by any of the software modules 306.

The memory 300 also includes an email and calendar client, which may be combined in, for example, a PIM application having email-based calendaring and scheduling functions. Typically, the PIM is installed as one of the software modules 306. Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4A:
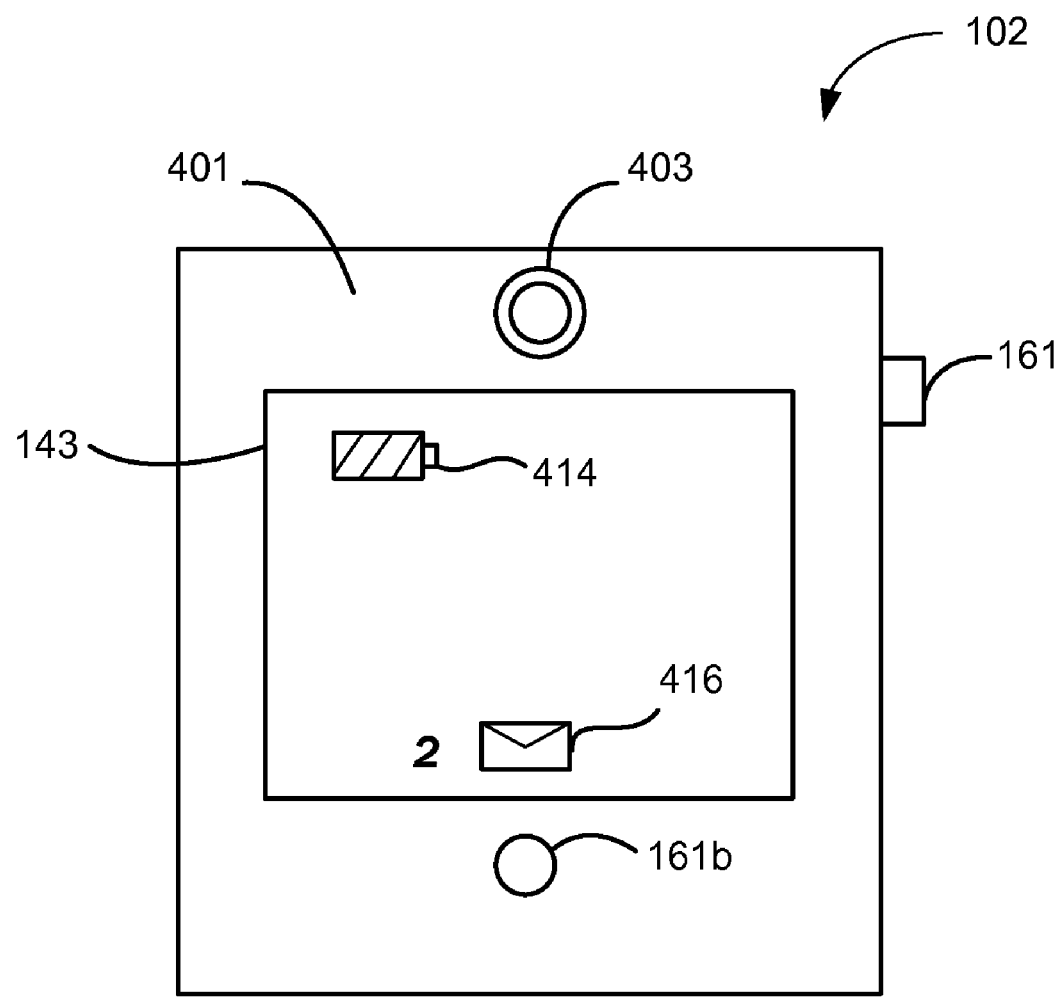
FIG. 4A is a front view illustrating an embodiment of the wireless device of FIG. 1 in a closed configuration.

Reference is next made to FIG. 4A, which shows a front view of an embodiment of the wireless device 102 in a closed configuration. In the shown embodiment, the wireless device 102 is a clamshell mobile communication device. As mentioned above, the wireless device 102 may be a data and/or voice-enabled handheld device. The wireless device 102 includes the primary display 142 that is visible when the wireless device 102 is in an opened configuration (FIG. 4B), and the optional secondary display 143 that is visible when the wireless device 102 is in a closed configuration. The term visible as used above is meant to say that the display may be viewable by the user looking at the front of the wireless device 102; however, the display may or may not be active or displaying the GUI 304 even when the display is not visible to the user. The primary display 142 may be off when the wireless device 102 is in the closed configuration in order to save battery power. Similarly, the secondary display 143 may be off when the wireless device 102 is in the opened configuration in order to save battery power, or the secondary display 143 may show a default image such as a background or a clock when the wireless device 102 is in the opened configuration. The front view of the closed wireless device 102 shows a lid 401, having the optional secondary display 143. The lid 401 may also include secondary navigation tools such as a selection button 161 or a secondary trackball 161*b*, and a camera lens 403. Although the selection button 161 may be used as a navigation tool for the secondary display 143 when the wireless device 102 is in the closed configuration, the selection button 161 may provide other functions, for example volume or camera control, when the wireless device 102 is in an opened configuration. These other functions for the selection button 161 may be disabled when the wireless device 102 is in the closed configuration, to prevent unintentional activity.

Figure 4B:
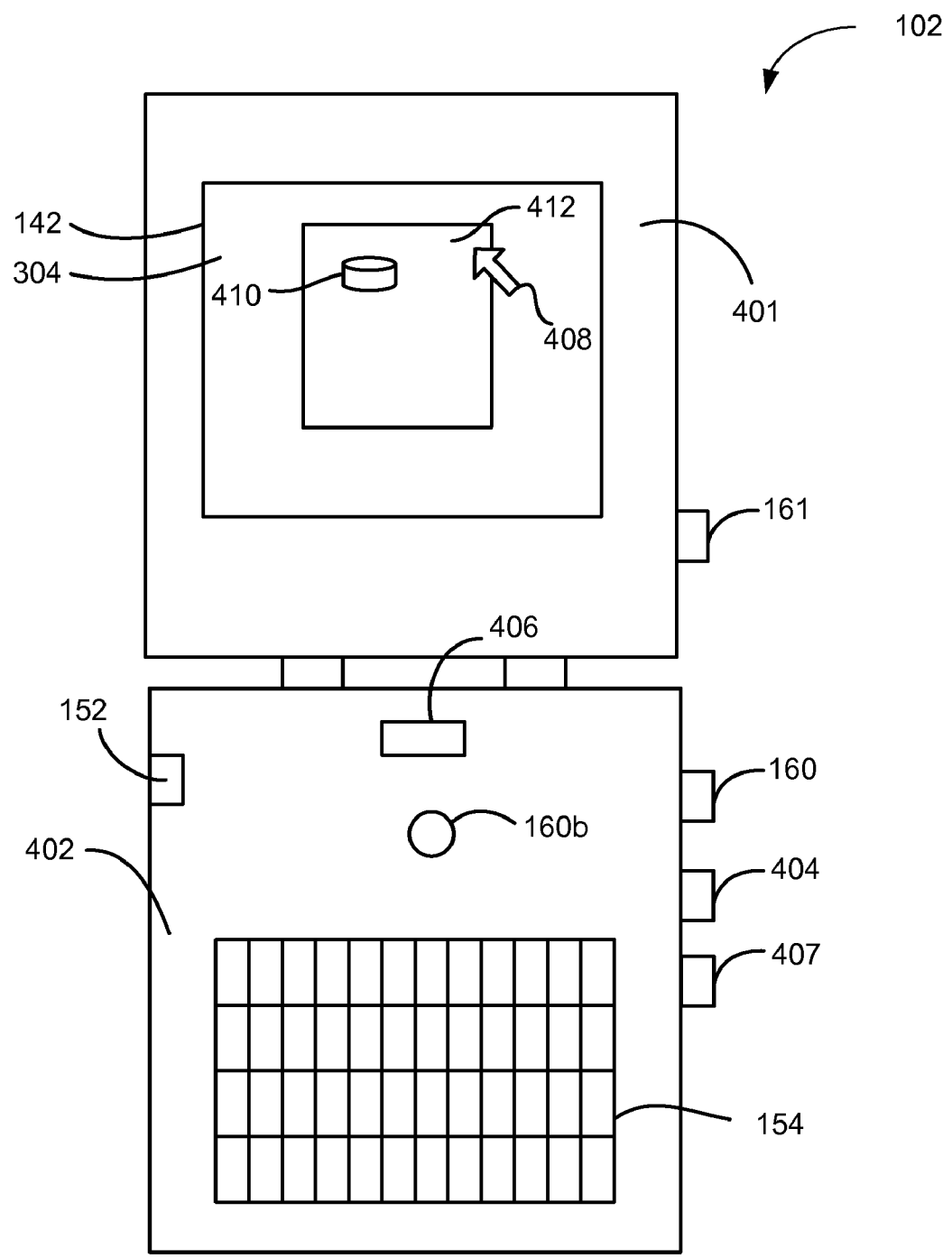
FIG. 4B is a front view illustrating the wireless device of FIG. 4A in an opened configuration.

Reference is next made to FIG. 4B, which shows a front view of the wireless device 102 of FIG. 4A in an opened configuration. The wireless device 102 includes a lower casing 402, the USB port 152, the primary display 142, which displays the GUI 304, the keypad 154, the clickable thumbwheel 160 or other device for navigation such as a trackball 160*b*, one or more input buttons 404 (e.g., select, cancel, talk buttons), signal inputs/outputs 406 (e.g., power connector input, microphone, speaker, data interface input, etc.), and an audio port 407. Although the wireless device 102 is shown with the primary display 142 being on the inside of the lid 401, the primary display 142 may also be on the lower casing 402 or in any other suitable location. Although the wireless device 102 is shown as having a selection button 161, the clickable thumbwheel 160 may be used instead, and the selection button 161 will be understood to apply equally to the clickable thumbwheel 160. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the primary display 142, the secondary display 143, the clickable thumbwheel 160, etc.

The microprocessor 140 is typically coupled to one or more input devices (e.g., the buttons 404, the keypad 154, the clickable thumbwheel 160, the open/close sensor 161) for receiving user commands, selections or queries, and the primary display 142 and the secondary display 143 for displaying the results of these commands or queries. For example, user queries may be transformed into a combination of commands for producing one or more tables of output data which may be incorporated in one or more display pages for presentation to the user. In another example, user selections may be transformed into a command for displaying a preview of the selection on the primary display 142 or the secondary display 143. The microprocessor 140 is also coupled to the memory 300.

A user may interact with the wireless device 102 and its software modules 306 using the GUI 304. The GUI 304 is controlled by the operating system 302 (FIG. 3) and provides a display format providing information to the user, or enabling the user to choose commands, execute application programs, manage computer files, and perform other functions by selecting pictorial representations (i.e., icons), or selecting items from a menu through the use of an input or pointing device such as the clickable thumbwheel 160 or the keypad 154. Generally, the GUI 304 is used to convey information and receive commands from users and includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user on the primary display 142 and the secondary display 143. The GUI 304 may provide for a full user interface on the primary display 142 and may provide a condensed or simplified user interface on the secondary display 143. For example, the GUI 304 may provide a window 412, which is a display area shown within the primary display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

The GUI 304 may provide for simplified user interaction on the secondary display 143 (FIG. 4A) when the wireless device 102 is closed. For example, the GUI 304 may provide status information, such as a battery status 414, but may not provide for full applications to be displayed. An event notification 416 may also be presented, alerting the user to a new or unacknowledged event, such as an incoming email, an incoming text message, an incoming phone call, an incoming multimedia message (MMS), an incoming instant message (IM), a voice mail notification, a task reminder, an upcoming calendar event, or an alarm event. The user may select an event notification 416 using the selection button 161. Additional information may be presented on the secondary display 143, such as the current time, or other background icons.

Conventional flip style or clamshell wireless device designs limit the amount of physical real estate available to a user for navigation, control of music, etc., because in a closed state the housing of the device typically protects and covers the user interface area. Also, such devices typically have fixed reusable keys that are difficult to use in at least one of the open or closed positions.

Aspects of the present application provide form factors that allow a user to access a number of keys or navigation solutions in a closed position, with those keys or navigation solutions being reusable in an open position and moved to a more appropriate location in the open position. In one example, as the flip-style device opens, the navigation bar travels from the bottom end of the device to a center position in between an internal keypad array and display screen or lens. Alternatively, the navigation bar may remain towards the bottom end of the device and be usable as a gamepad controller or GPS navigation tool. Moving the navigation bar may cause the flip-style device to open or, alternatively, opening the flip-style device may cause the navigation bar to move. Buttons on the navigation bar may serve different functions in the closed configuration as opposed to the open configuration.

Figure 5A:
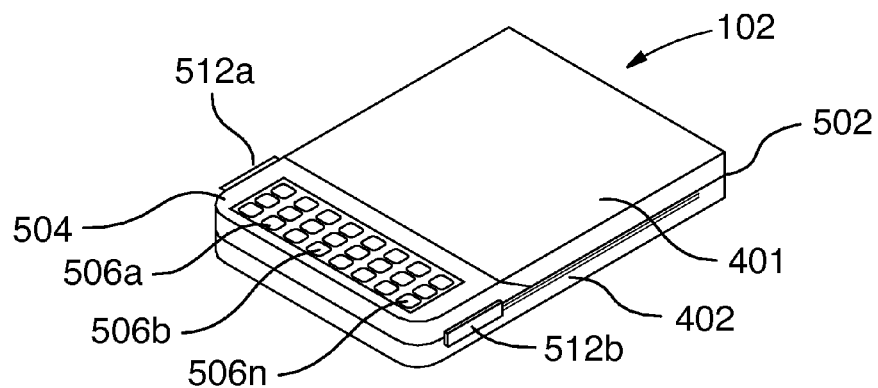
FIGS. 5a, 5b, and 5c are perspective views illustrating a clamshell device in closed, slightly open, and opened positions in accordance with one embodiment.
Figure 5B:
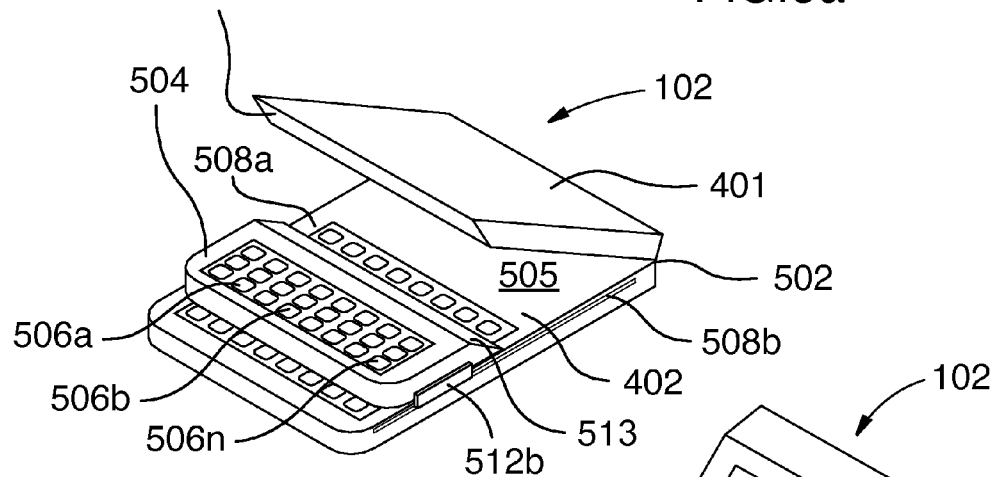
Figure 5C:
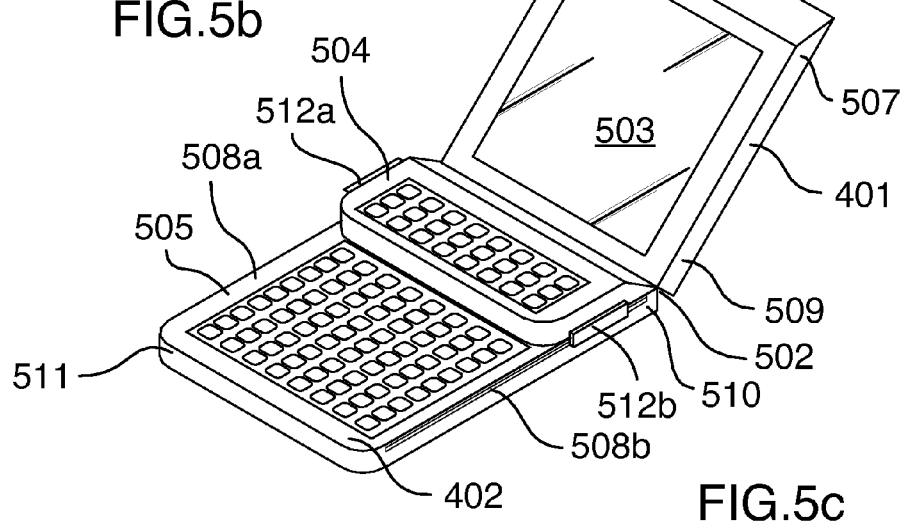

Reference is next made to FIGS. 5*a*, 5*b*, and 5*c* collectively referred to as FIG. 5. The wireless device 102 is henceforth referred to as the clamshell device 102, in order to reflect the content of FIGS. 5-9. FIGS. 5*a*, 5*b*, and 5*c* are perspective views illustrating a clamshell device in closed, slightly open, and opened positions respectively in accordance with one embodiment.

As shown in FIG. 5, the clamshell device includes the lid 401 and the lower casing 402. The lid 401 and the lower casing 402 are attached at their upper or top ends with a hinge component or pin 502, with the lid 401 rotatably coupled to the lower casing 402. The clamshell device 102 is rotatable from the closed position (e.g., FIG. 5a) to the open position (e.g., FIG. 5c) and back from the open position to the closed position. In the closed position, the lid 401 and lower casing 402 have adjacent facing surfaces 403 and 404, respectively, as shown in FIG. 5.

As mentioned above, the lid 401 has a bottom end 507 and a top end 509 and the lower casing 402 has a top end 510 and a bottom end 511, where the top end 509 of the lid 401 is rotatably coupled to the top end 510 of the lower casing 402 with the hinge component 502. The clamshell device 102 is therefore rotatable from a closed position to an open position and from an open position to a closed position. The lid 401 and the lower casing 402 have the adjacent facing surfaces 503, 505 when in the closed position. In one example, the lid 401 may be shorter in length than the lower casing 402 such that the bottom end of the lower casing 402 and the bottom end of the lid 401 do not align when in the closed position. The lid 401 may be shorter in length than the lower casing 402 to accommodate a slideable control bar 504. The slideable control bar 504 may reside adjacent the bottom end of the lid 401 and on top of the facing surface of the lower casing 402 when the clamshell device 102 is in the closed position, as shown in FIG. 5a.

When the clamshell device 102 is opened, the slideable control bar 504 may slide along the facing surface 505 of the lower casing 402 towards the top end 510 of the lower casing 402. Alternatively, the slideable control bar 504 may slide along the facing surface 503 of the lid 401 (not shown). FIG. 5b shows the slideable control bar 504 part way along its journey from the bottom end 511 of the lower casing 402 towards the top end 510 of the lower casing 402. In one example, the slideable control bar 504 may slide along the facing surface 505 of the lower casing 402 and come to rest adjacent the hinge component 502 when the wireless device 102 is in the open position, as shown in FIG. 5c. In one example, movement of the slideable control bar 504 may be manually actuated such that the slideable control bar 504 is moved by a user exerting force on the slideable control bar 504. In this example where the slideable control bar 504 is manually actuated, the slideable control bar 504 may be positioned wherever the user wishes. For example, the user may choose to leave the slideable control bar 504 near the bottom end 511 of the lower casing 402 even when the clamshell device 102 is in the open position, perhaps while playing games on the clamshell device 102. In another example, the slideable control bar 504 may be automatically displaced from the position near the bottom end 511 of the lower casing 402 to the top end 510 of the lower casing 402 when the clamshell device 102 is opened. In one example, this automatic displacement may occur using mechanical linkages or electric motors (not shown).

The slideable control bar 504 may include one or more buttons 506a-n, individually indicated as 506a, 506b, . . . , 506n, for accepting one or more inputs. The buttons 506a-n may be configured to provide the function of any of the keyboard 154, the trackball 160, the input buttons 404, or any other input device on the clamshell device 102. Alternatively, the buttons 506 may be separate input buttons from the keyboard 154, the trackball 160, or the input buttons 404 and may be configurable by the user of the clamshell device 102 to provide either redundant or unique inputs, depending on settings set by the user. In one example, the buttons 506a-n are accessible when the clamshell device 102 is in the closed position to provide for the user of the clamshell device 102 to provide easy inputs to the clamshell device 102 without having to open the clamshell device 102. The buttons 506a-n may be configured to trigger different functions when the clamshell device 102 is in the closed position as compared to the open position.

As shown in FIGS. 5b and 5c, the lower casing 402 of the clamshell device 102 may further include slide guides 508a and 508b along left and right edges, respectively, of the lower casing 402 for holding the slideable control bar 504 in place and for facilitating sliding of the slideable control bar 504 along the facing surface of the lower casing 402 towards the top end of the lower casing 402. Alternatively, in the example where the slideable control bar 504 slides along the facing surface 503 of the lid 401, the slide guides 508a and 508b may be located along left and right edges, respectively, of the lid 401. (not shown) The slideable control bar 504 may have lips 512a and 512b at left and right edges, respectively, of the slideable control bar 504 adjacent the facing surface of the lower casing 402 that engage the respective slide guides 508a, 508b In one example, as shown in FIG. 5, the recessed grooves or rails may be located along the outer left and right edges of the lower casing 402. Alternatively (not shown), the slide guides 508a, 508b may either be recessed grooves defined in the facing surface of the lower casing 402 or rails that protrude from the facing surface of the lower casing 402.

The slideable control bar 504 may further have an angled upper edge 513, best illustrated in FIG. 5b. The bottom end of the lid 401 may have a complementary angled lower edge 512. The complementary angled edges 510 and 512 may be configured such that initiation of sliding of the slideable control bar 504 along the facing surface of the lower casing 402 towards the top end of the lower casing 402 when the clamshell device 102 is in the closed position forces the lid 401 to begin to rotate towards the open position. In other words, when a user pushes on the slideable control bar 504 to push the control bar 504 towards the top end of the device 102, the angled upper edge 513 forces the lid 401 to begin to open, therefore making it easier for the user to open the clamshell device 102.

Some embodiments of the configuration described in connection with FIG. 5 are intended to make it easier for a user to open the clamshell device 102. For example, typical clamshell devices are generally difficult to open because an initial force is needed to initially separate the lid 401 from the lower casing 402, after which the device becomes easier to flip open. This initial force is typically related to the force holding the clamshell device shut (e.g., caused by a spring or magnet), and is initially difficult to exert on typical clamshell devices because the lid and lower casing are usually thin and nearly perfectly aligned with respect to each other. Such a configuration makes it difficult to grasp both opposing parts (i.e., the lid and lower casing) in order to exert the opening force and open the typical clamshell device.

Some embodiments of the configuration described in connection with FIG. 5 are intended to give the user greater control of the clamshell device 102 by providing the user with easy access to the buttons 506a-n, both when the clamshell device 102 is in the open configuration and the closed configuration.

Figure 6A:
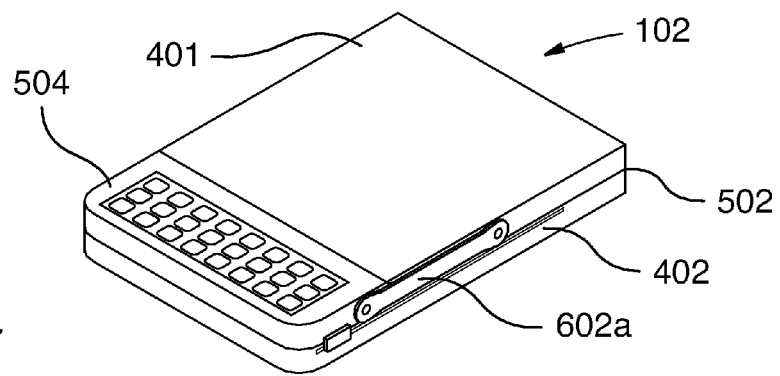
FIGS. 6a, 6b, and 6c are perspective views illustrating a clamshell device in closed, slightly open, and opened positions in accordance with another embodiment.
Figure 6B:
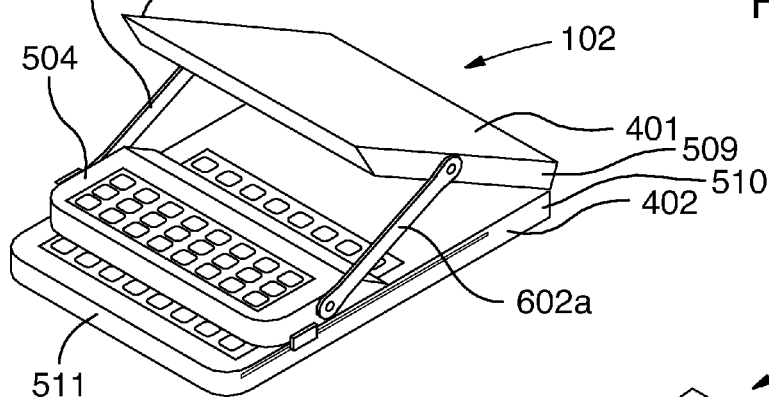
Figure 6C:
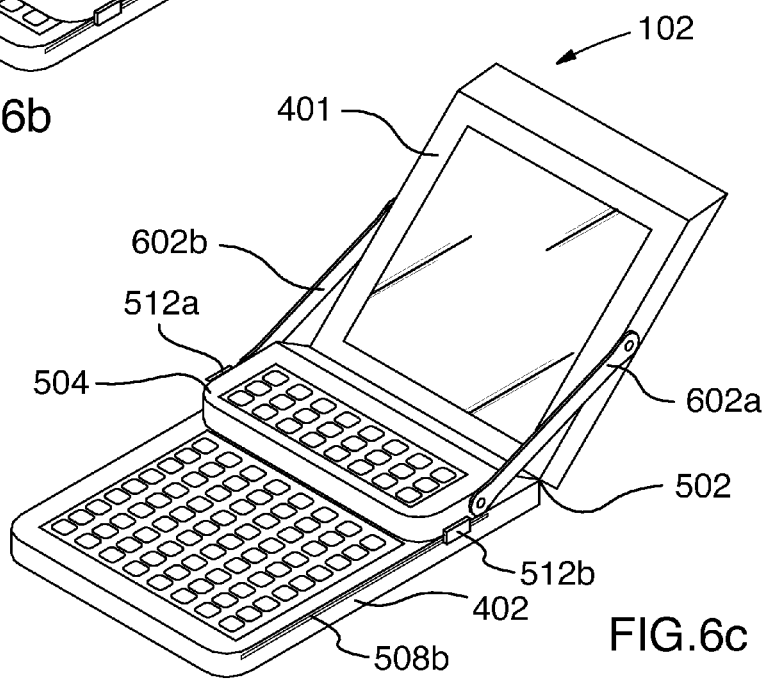

Reference is next made to FIGS. 6a, 6b, and 6c collectively referred to as FIG. 6. FIGS. 6a, 6b, and 6c are perspective views illustrating a clamshell device in closed, slightly open, and opened positions respectively in accordance with one embodiment.

The clamshell device 102 shown in FIG. 6 may add a right linkage 602a and a left linkage 602b, which may also be referred to as pivot arms 602a, b, to the clamshell device 102 of FIG. 5. The left and right edges of the slideable control bar 504 may be coupled to left and right edges of the lid 402 by the left and right pivot arms 602a, 602b, as shown in FIG. 6. The slideable control bar 504 may therefore automatically slide along the slide guides 508a, b along the facing surface of the lower casing 402 towards the top end 510 of the lower casing 402 when the lid is lifted from the closed position to the open position. Alternatively, pushing the slideable control bar 504 along the facing surface of the lower casing 402 towards the top end of the lower casing 402 may automatically flip open the clamshell device 102 from the closed position to the open position, a result of using the pivot arms 602a, 602b.

Figure 7A:
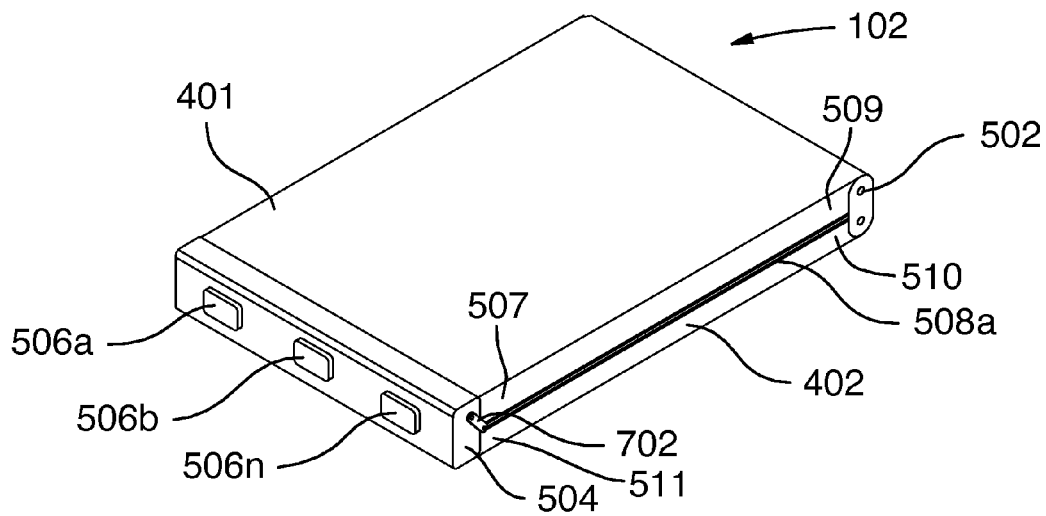
FIG. 7a, is a perspective view
Figure 7B:
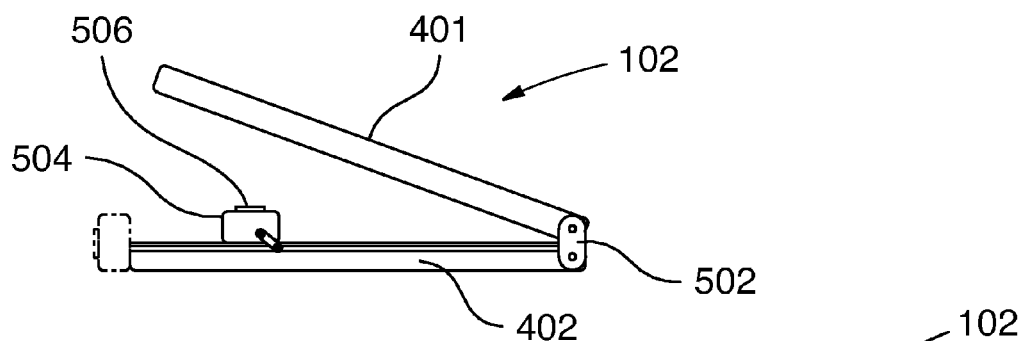
FIGS. 7b and 7c are side views illustrating a clamshell device in closed, slightly open, and opened positions in accordance with another embodiment.
Figure 7C:
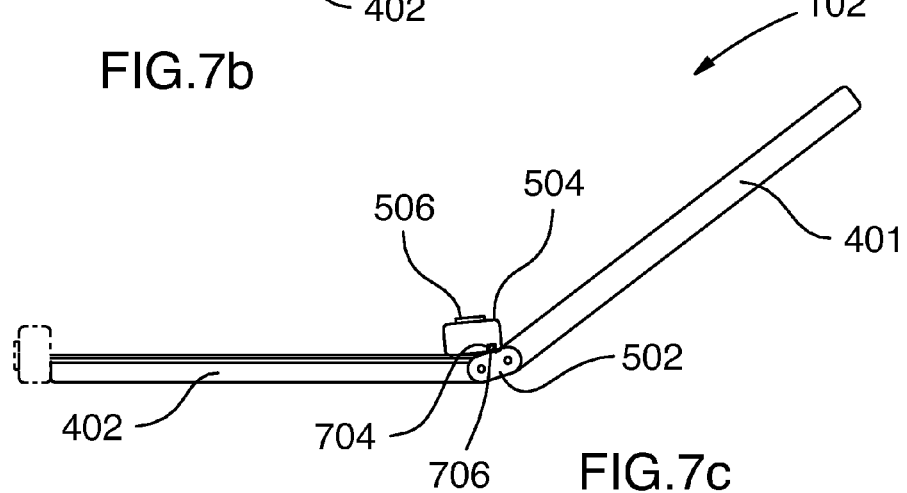

Reference is next made to FIGS. 7a, 7b, and 7c collectively referred to as FIG. 7. FIG. 7a, is a perspective view and FIGS. 7b and 7c are side views illustrating a clamshell device in closed, slightly open, and opened positions in accordance with one embodiment of the present description.

The clamshell device 102 shown in FIG. 7 illustrates one or more variations to the clamshell device 102 of FIG. 5. Referring to FIG. 7, the clamshell device 102 has a lower casing 402 having a bottom end 511 and a top end 510 and a lid 401 having a bottom end 507 and a top end 509. The top end 509 of the lid 401 is rotatably coupled to the top end 510 of the lower casing 402 with at least one hinge component 502 such that the handheld device is rotatable from a closed position to an open position and from the open position to the closed position. The lid 401 and the lower casing 402 having adjacent facing surfaces 503, 505 (shown in FIG. 5) when in the closed position. A slideable control bar 504 resides adjacent the bottom end of the lid 401 and the bottom end of the lower casing 402 when the clamshell device 102 is in the closed position. When the clamshell device 102 is opened, the slideable control bar 504 may first rotate into position on the facing surface 505 of the lower casing 402 and then slide along the facing surface 505 towards the top end of the lower casing 402. The positioning of the slideable control bar 502 may be biased either towards or away from its position adjacent the bottom end of the lid 401 and the bottom end of the lower casing 402. In one example, this bias may be provided by a spring (not shown).

In the clamshell device 102 shown in FIG. 7, the slideable control bar 504 may reside below the bottom end of the lid 401 and below the bottom end of the lower casing 402 when the clamshell device 102 is in the closed position. The lid 401 and the lower casing 402 may be of approximately or substantially equal length. The slideable control bar 504 may reside in an orientation that is rotated approximately or substantially ninety degrees when the clamshell device 102 is in the closed position compared to when the clamshell device 102 is in the open position. Alternatively, any suitable amount of rotation may be used. For example, the buttons 506a-n shown in FIG. 7a are facing in a downwards direction relative to the clamshell device 102, whereas the buttons 506a-n shown in FIG. 7c are facing outward relative to the facing surface 505 of the lower casing 402, showing a rotation of the slideable control bar 504 of approximately ninety degrees.

The lower casing 402 may further include slide guides 508a and 508b along outer left and right edges of the lower casing (only guide 508a is shown in FIG. 7) for holding the slideable control bar 504 in place and for facilitating sliding of the slideable control bar 504 along the facing surface 505 of the lower casing 402 towards the top end 510 of the lower casing 402. In one example, to allow the slideable control bar 504 to rotate into its resting position at the bottom end of the clamshell device 102 when the clamshell device 102 is in the closed position, the slideable control bar 504 may be coupled to the slide guides 508a, 508b with pivot arms 702 (only the pivot arm on the right side of the clamshell device 102 is shown in FIG. 7a). The pivot arms 702 may be smaller than the pivot arms 602a, b shown in FIG. 6 and may extend from the sides of the slideable control bar 504 and engage the slide guides 508a, 508b. In the example shown in FIG. 7, the slide guides 508a, 508b may be located along the outer edges of the lower casing 402.

In the clamshell device 102 shown in FIG. 7, the slideable control bar 504 may first rotate substantially or approximately ninety degrees from the position below the bottom end of the lid 401 and the bottom end of the lower casing 402 when in the closed position. Once the rotation is completed as the slideable control bar 504 rotates into position above the facing surface 505 of the lower casing 402, the slideable control bar 504 may then slide along the facing surface 505 of the lower casing 402 and comes to rest adjacent the hinge component 502 when the clamshell device 102 is in the open position.

In one example, as shown in FIG. 7c, the slideable control bar 504 may again rotate when the control bar 504 arrives adjacent the hinge component 502, enabling the control bar 504 to be in an angled orientation relative to the lower casing 402, thereby allowing the user to easily access the buttons 506a-n. The slideable control bar 504 may also define a recess 704 on its underside that engages a snap or tooth 706 to help retain the slideable control bar in the position adjacent the hinge component 502. In one example, the snap or tooth 706 may be located on the upper end of the facing surface of lower casing 402. In another example, the snap or tooth 706 may be located on the upper end of the facing surface of lid 401, which may provide the advantage of automatically disengaging the tooth 706 from the recess 704 once the lid 401 is rotated towards the closed position.

Figure 8A:
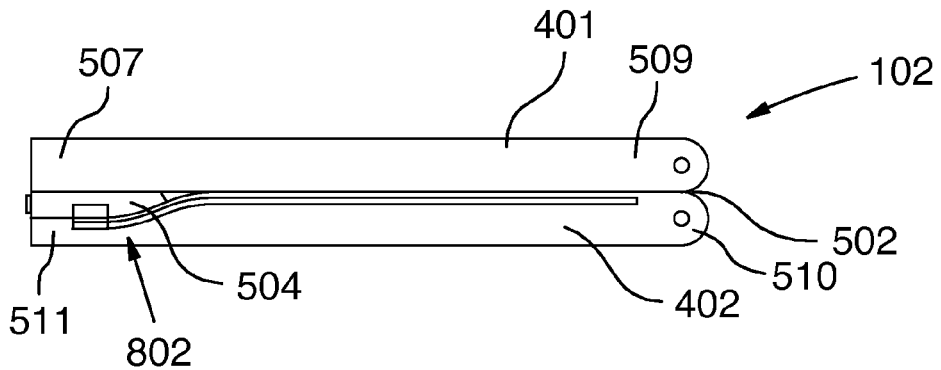
FIG. 8a is a side view and FIG. 8b is a bottom view illustrating a clamshell device in a closed position.
Figure 8B:
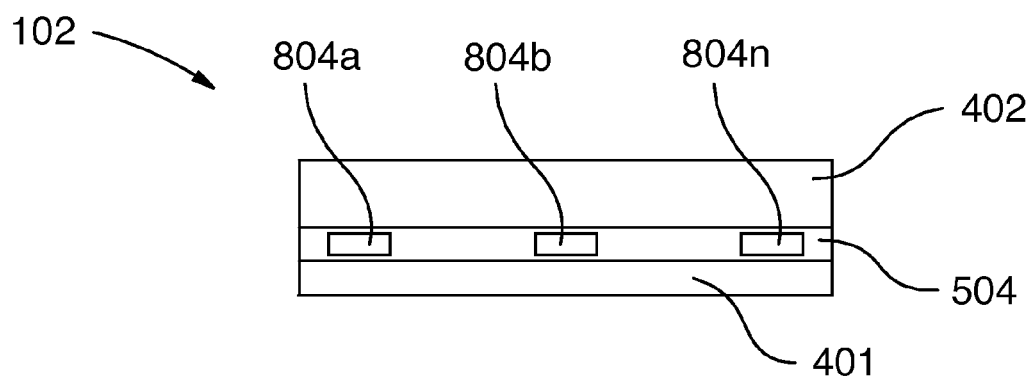
Figure 8C:
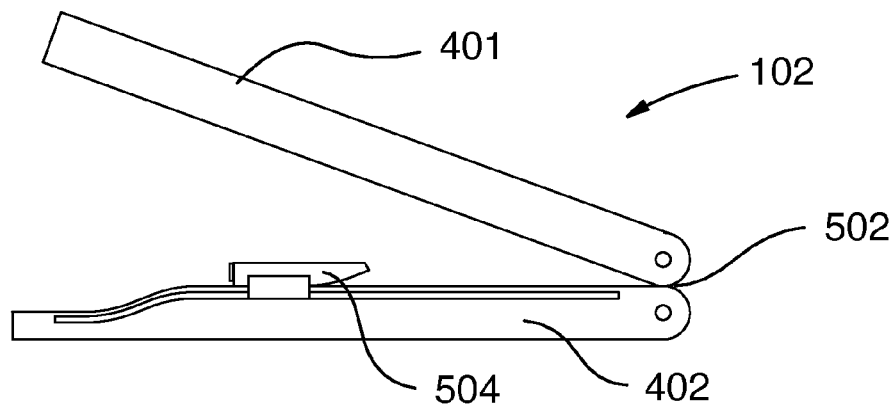
FIG. 8c is a side view illustrating a clamshell device in a slightly opened position.
Figure 8D:
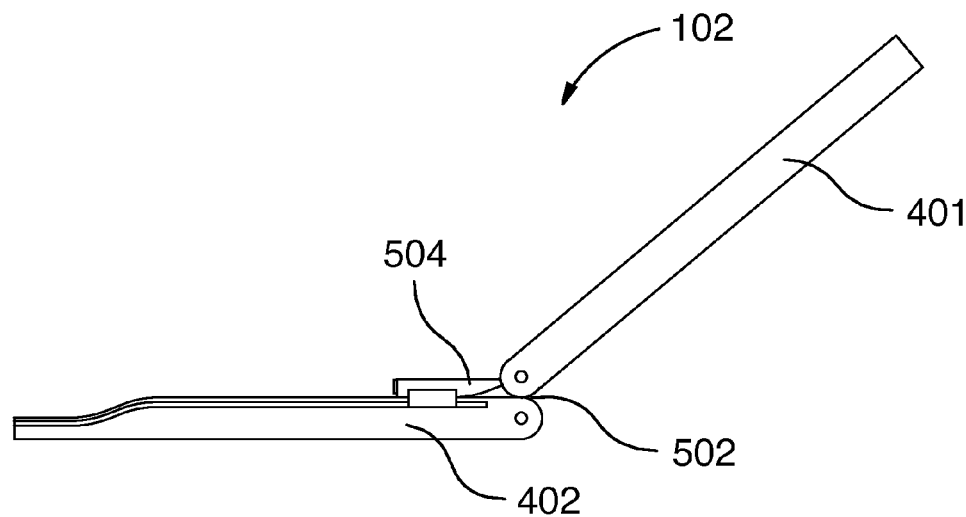
FIG. 8d is a side view and FIG. 8e is a perspective view illustrating a clamshell device in an open position.
Figure 8E:
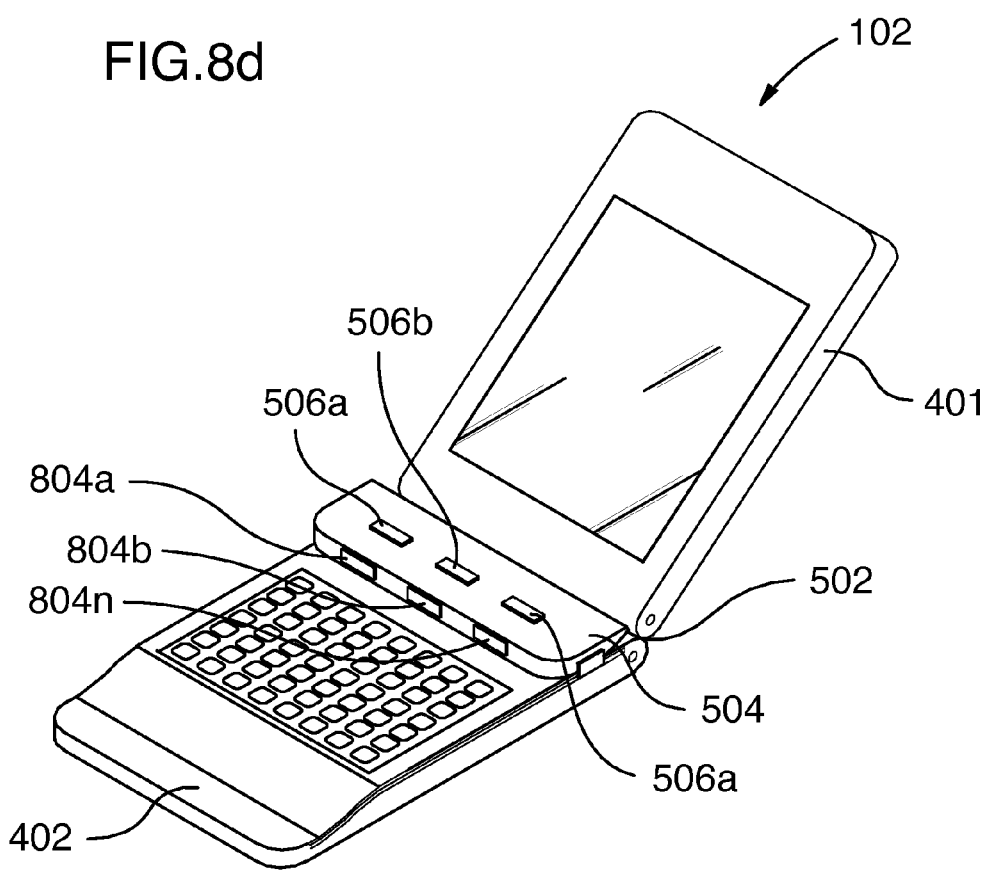
Figure 8F:
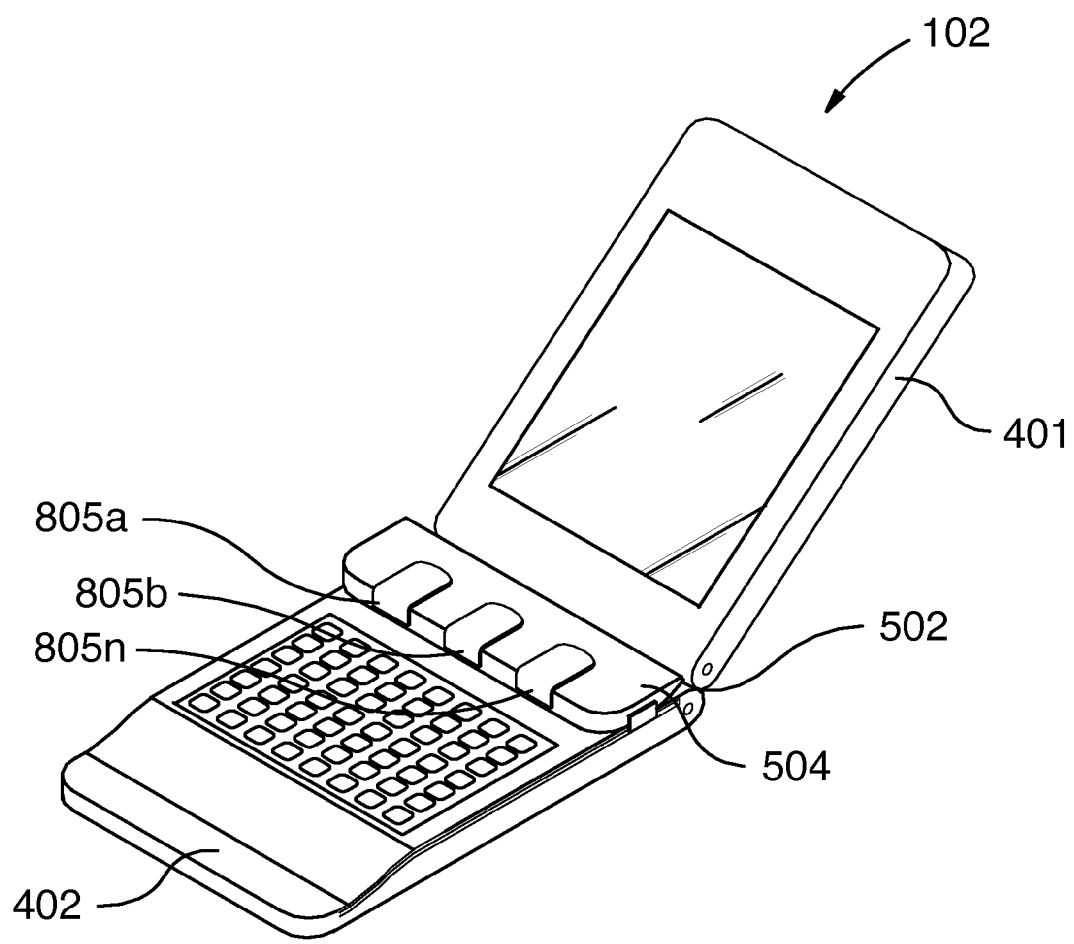
FIG. 8f is a perspective view illustrating an input key arrangement in accordance with another embodiment.
Figure 8G:
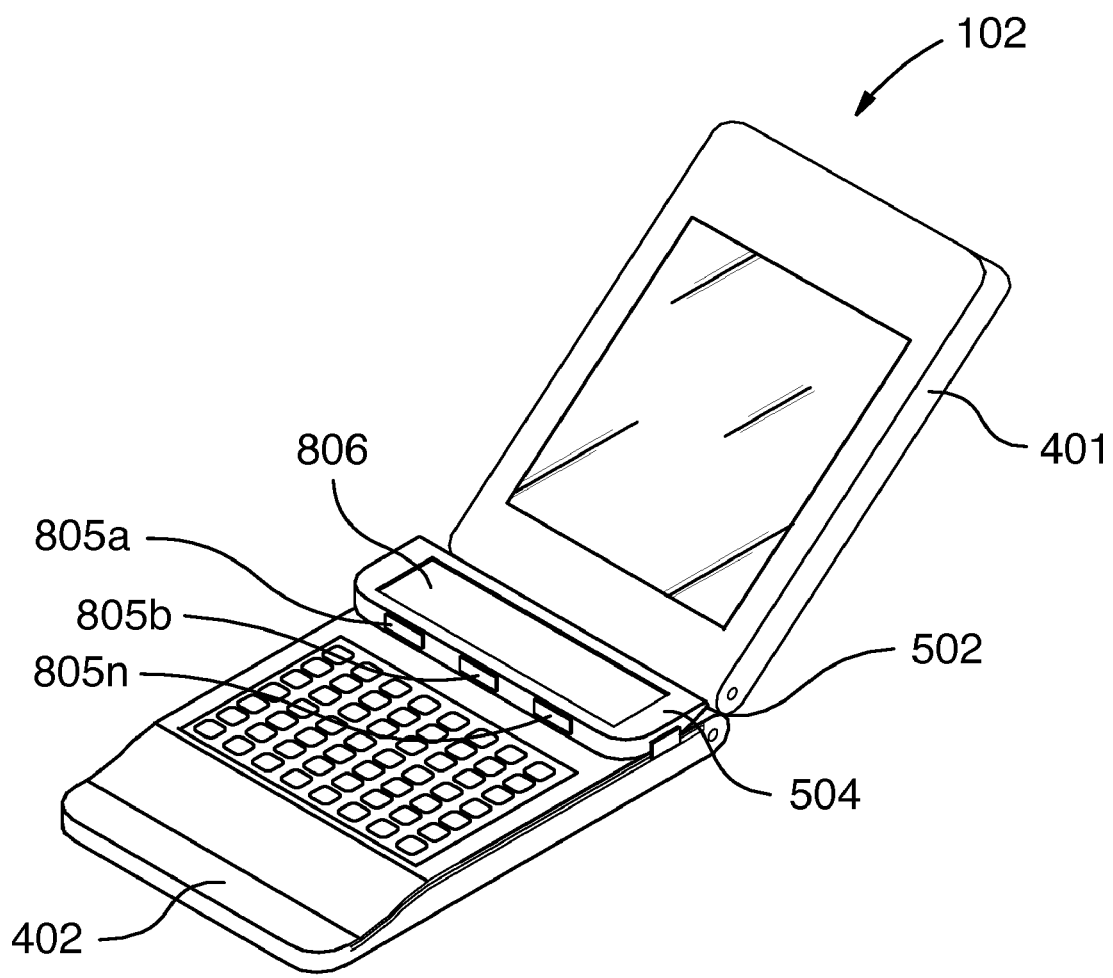
FIGS. 8g and 8h show perspective views of a slideable control bar in accordance with another embodiment.

Reference is next made to FIGS. 8a, 8b, 8c, 8d, 8e, 8f, 8g, and 8h, collectively referred to as FIG. 8. FIG. 8a is a side view and FIG. 8b is a bottom view illustrating a clamshell device in a closed position, FIG. 8c is a side view illustrating a clamshell device in a slightly opened position, and FIG. 8d is a side view, and FIG. 8e is a perspective view illustrating a clamshell device in an opened position in accordance with another embodiment. FIG. 8f shows a perspective view of an input button arrangement according to one embodiment. FIGS. 8g and 8f show perspective views of variations of the slideable control bar 504 in accordance with different embodiments.

The clamshell device 102 shown in FIG. 8 illustrates one or more variations to the clamshell device 102 of FIG. 5. Referring to FIG. 8, the clamshell device 102 has a lower casing 402 having a bottom end 511 and a top end 510 and a lid 401 having a bottom end 507 and a top end 509. The top end 509 of the lid 401 is rotatably coupled to the top end 510 of the lower casing 402 with at least one hinge component 502 such that the clamshell device 102 is rotatable from a closed position to an open position and from the open position to the closed position. The lid 401 and the lower casing 402 having adjacent facing surfaces 503, 505 (shown in FIG. 5) when in the closed position. A slideable control bar 504 resides adjacent the bottom end 507 of the lid 401 and the bottom end 511 of the lower casing 402 when the clamshell device 102 is in the closed position. When the clamshell device 102 is opened, the slideable control bar 504 may slide along the facing surface 505 of the lower casing 402 towards the top end 510 of the lower casing 402.

In the clamshell device 102 shown in FIG. 8, the slideable control bar 504 may reside between the bottom end 507 of the lid 401 and the bottom end 511 of the lower casing 402 when the clamshell device 102 is in the closed position. The lid 401 and the lower casing 402 may be of approximately or substantially equal length. The facing surface of at least one of the lid 401 and the lower casing 402 may be sloped near the bottom end such that the facing surface of at least one of the lid 401 and the lower casing 402 slopes away from the facing surface of the other near the bottom ends of the lid and the casing when in a closed position. Such a configuration defines a space for the slideable control bar 504 to rest when the clamshell device 102 is in the closed position, as is best shown in FIGS. 8a and 8b. In the example illustrated in FIG. 8, the lower casing 401 is sloped, indicated by reference 802, creating the space for the slideable control bar 504 to rest when the clamshell device 102 is in the closed position. In this example, the slideable control bar 504 may have a number of additional buttons indicated as 804a, 804b . . . 804n, that are accessible when the clamshell device is in the closed position, as is best illustrated in FIG. 8b. The slideable control bar 504 may also have the buttons 506a-n, best illustrated in FIG. 8e, however the buttons 804 may also be accessible and usable when the clamshell device 102 is in the open position. FIG. 8f shows an example of the control bar 504 having buttons 805, individually indicated as 805a, 805b, . . . , 805n, arranged such that the buttons 805 are accessible from two sides of the control bar 504 (e.g., accessible from bottom end of the clamshell device 102 in the closed position of FIG. 8a and easily accessible when the control bar 504 is in the upper position as shown in FIG. 8e).

Figure 8H:
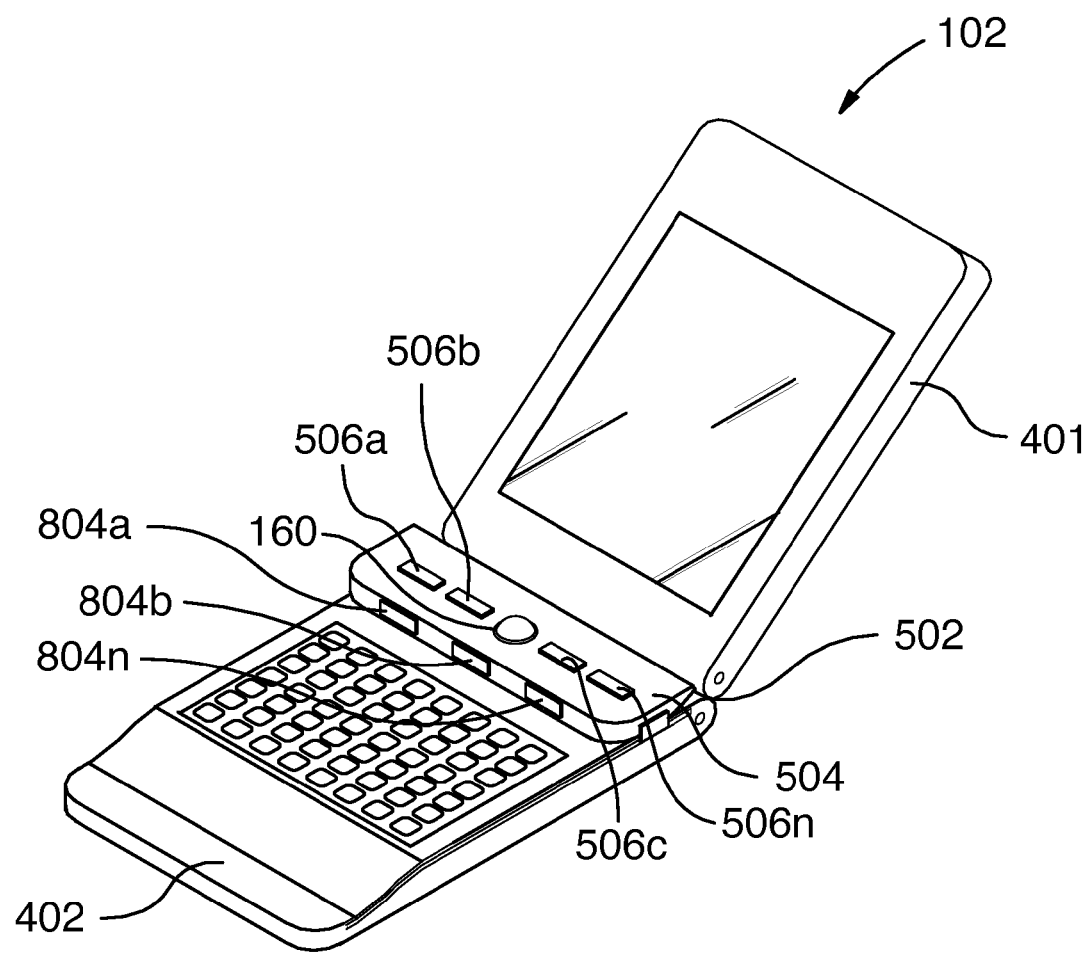

FIG. 8g shows an example of the control bar 504 having the buttons 804, individually indicated as 804a, 804b, . . . , 804n, and a touch screen 806. The touch screen 806 may be used to illustrate information and/or delineate touch sensitive areas of the screen 806. The touch screen 806 may also indicate to the user what inputs those touch sensitive areas represent (e.g., as previously configured by the user, by the OS 302 or GUI 304, or the software modules 306), detect a user touching one or more of those areas, and supply associated input(s) to the processor 140 (FIG. 1). Alternatively, as shown in FIG. 8h, the control bar 504 may have the buttons 506a-n, individually indicated as 506a, 506b, 506c, . . . , 506n, the buttons 804a-n, individually indicated as 804a, 804b, . . . , 804n, and the input device 160, such as a track ball.

Figure 9A:
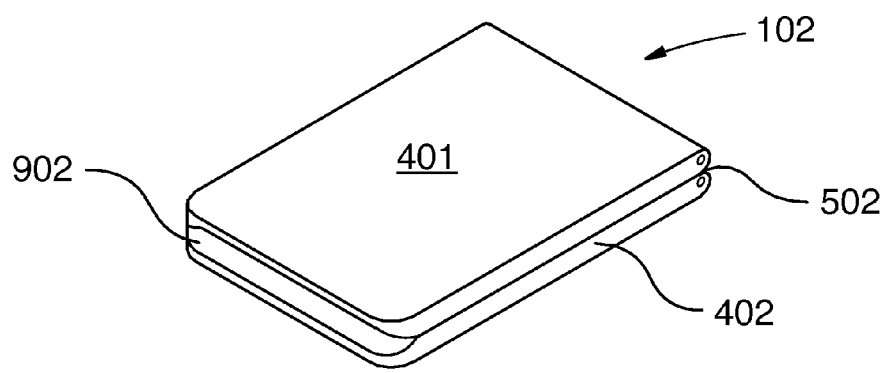
FIGS. 9a and 9d are perspective views and FIG. 9b is a side view illustrating a clamshell device in a closed position and FIG. 9c is a side view illustrating a clamshell device in an open position in accordance with another embodiment.
Figure 9B:
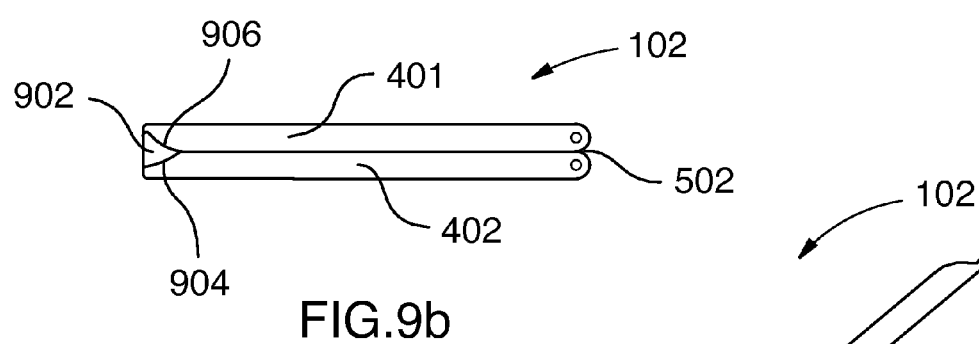
Figure 9C:
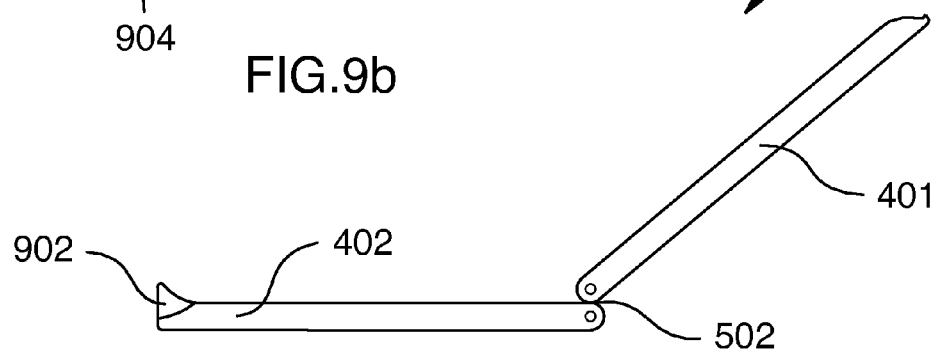
Figure 9D:
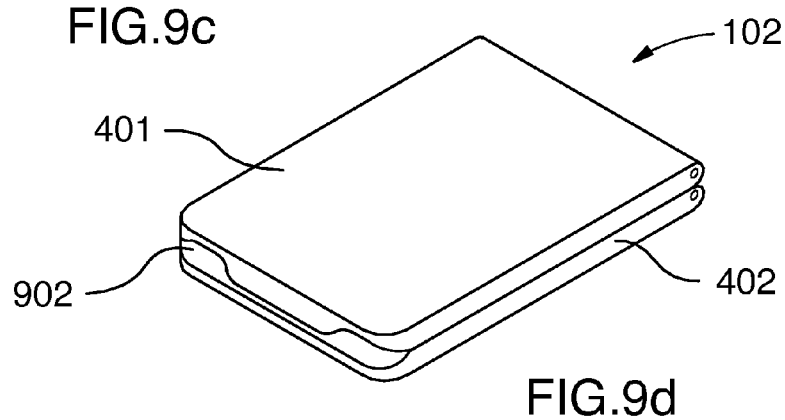

Reference is next made to FIGS. 9a, 9b, 9c, and 9d collectively referred to as FIG. 9. FIGS. 9a and 9d are perspective views and FIG. 9b is a side view illustrating a clamshell device in a closed position and FIG. 9c is a side view illustrating a clamshell device in an open position in accordance with another embodiment.

The clamshell device 102 shown in FIG. 9 illustrates one or more variations to the clamshell device 102 of FIG. 8. Referring to FIG. 9, the clamshell device 102 has a lower casing 402 having a bottom end and a top end and a lid 401 having a bottom end and a top end. The top end of the lid 401 is rotatably coupled to the top end of the lower casing 402 with at least one hinge component 502 such that the handheld device is rotatable from a closed position to an open position and from the open position to the closed position. The lid 401 and the lower casing 402 having adjacent facing surfaces when in the closed position. A slideable button 902 resides adjacent the bottom end of the lid 401 and the bottom end of the lower casing 402 when the clamshell device 102 is in the closed position.

The lid 401 and the lower casing 402 may be of approximately or substantially equal length. The facing surface of at least one of the lid 401 and the lower casing 402 may be sloped near the bottom end such that the facing surface of at least one of the lid 401 and the lower casing 402 slopes away from the facing surface of the other near the bottom ends of the lid and the casing when in a closed position. Such a configuration defines a space for the slideable button 902 to rest when the clamshell device 102 is in the closed position, as shown best in FIGS. 9a and 9b. In the example illustrated in FIG. 9, both the lower casing 402 and the lid 401 are sloped, indicated by references 904 and 906 respectively, creating the space for the slideable button 902 to rest when the clamshell device 102 is in the closed position.

In one example, the button 902 may slide a limited amount in the direction of the top end of the clamshell device 102 when pushed by a user, therefore deflecting the lid 401 upwards (through contact with the sloped surface 906), aiding in the opening of the clamshell device 102. In one example, the hinge component 502 may be spring loaded, causing the clamshell device 102 to open entirely when the button 902 is pressed.

FIG. 9d illustrates another example where the button 902 may take a more irregular shape, and is not necessarily triangular as shown in FIGS. 9a-c. Alternatively, button 902 may be formed in any suitable shape.

While the present disclosure is primarily described as a system, a person of ordinary skill in the art will understand that the present disclosure is also directed to a method for carrying out the disclosed system and including method steps for performing each described aspect of the interaction of the apparatus parts.

The above illustrations use an exemplary clam-shell flip phone device, but the concepts can be expanded to a slideable mobile device, a twist mobile device or any mobile device with two distinct housings that is capable of being opened and closed.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:
1. A wireless handheld device comprising:
 a lower casing having a bottom end and a top end;
 a lid having a bottom end and a top end, the top end of the lid being rotatably coupled to the top end of the lower casing with at least one hinge component such that the handheld device is rotatable from a closed position to an open position and from the open position to the closed position, the lid and the lower casing have adjacent facing surfaces when in the closed position; and
 a slideable control bar provided on the lower casing;
 wherein, when the wireless handheld device is opened, the slideable control bar is slideable along the facing surface of the lower casing towards the top end of the lower casing;

wherein the lid is shorter than the lower casing such that the bottom end of the lower casing and the bottom end of the lid are misaligned when in the closed position, the slideable control bar residing adjacent the bottom end of the lid and on top of the facing surface of the lower casing when in the closed position.

2. The wireless handheld device according to claim 1, wherein the slideable control bar includes one or more buttons for accepting one or more inputs.

3. The wireless handheld device according to claim 2, wherein the buttons are accessible when the wireless handheld device is in the closed position.

4. The wireless handheld device according to claim 1, wherein the lower casing further includes slide guides along left and right edges for holding the slideable control bar in position and for facilitating sliding of the slideable control bar along the facing surface of the lower casing.

5. The wireless handheld device according to claim 1, wherein the slideable control bar is slideable along the facing surface of the lower casing and comes to rest adjacent the hinge component when the wireless device is in the open position.

6. The wireless handheld device according to claim 1, wherein the slideable control bar has an angled upper edge and the bottom end of the lid has a complementary angled lower edge, the complementary angled edges configured such that initiation of sliding of the slideable control bar along the facing surface of the lower casing towards the top end of the lower casing when the wireless handheld device is in the closed position forces the lid to begin to rotate towards the open position.

7. A wireless handheld device comprising:
a lower casing having a bottom end and a top end;
a lid having a bottom end and a top end, the top end of the lid being rotatably coupled to the top end of the lower casing with at least one hinge component such that the handheld device is rotatable from a closed position to an open position and from the open position to the closed position, the lid and the lower casing have adjacent facing surfaces when in the closed position; and
a slideable control bar provided on the lower casing;
wherein, when the wireless handheld device is opened, the slideable control bar is slideable along the facing surface of the lower casing towards the top end of the lower casing;
wherein left and right edges of the slideable control bar are coupled to left and right edges of the lid by left and right pivot arms such that the slideable control bar automatically slides along the facing surface of the lower casing towards the top end of the lower casing when the lid is lifted from the closed position to the open position.

8. The wireless handheld device according to claim 7, wherein the slideable control bar includes one or more buttons for accepting one or more inputs.

9. A wireless handheld device comprising:
a lower casing having a bottom end and a top end;
a lid having a bottom end and a top end, the top end of the lid being rotatably coupled to the top end of the lower casing with at least one hinge component such that the handheld device is rotatable from a closed position to an open position and from the open position to the closed position, the lid and the lower casing having adjacent facing surfaces when in the closed position; and
a slideable control bar residing adjacent the bottom end of the lid and the bottom end of the lower casing when in the closed position;
wherein, when the wireless handheld device is opened, the slideable control bar is slideable along one of the facing surface of the lower casing towards the top end of the lower casing and the facing surface of the lid towards the top end of the lid;
wherein the slideable control bar resides below the bottom end of the lid and the bottom end of the lower casing when in the closed position, the lid and the lower casing being of substantially equal length, the slideable control bar residing in an orientation that is rotated substantially ninety degrees when the wireless handheld device is rotated from the closed position to the open position.

10. The wireless handheld device according to claim 9, wherein the slideable control bar is slideable along the facing surface of the lower casing and the lower casing further includes slide guides along left and right edges of the lower casing for holding the slideable control bar in position and for facilitating sliding of the slideable control bar along the facing surface of the lower casing towards the top end of the lower casing, the slideable control bar being coupled to the slide guides with pivot arms.

11. The wireless handheld device according to claim 9, wherein the slideable control bar is slideable along the facing surface of the lid and the lid further includes slide guides along left and right edges of the lid for holding the slideable control bar in position and for facilitating sliding of the slideable control bar along the facing surface of the lid towards the top end of the lid, the slideable control bar being coupled to the slide guides with pivot arms.

12. The wireless handheld device according to claim 9, wherein the slideable control bar includes one or more buttons for accepting one or more inputs.

13. The wireless handheld device according to claim 12, wherein the one or more buttons are accessible when the wireless handheld device is in the closed position.

14. The wireless handheld device according to claim 12, wherein the one or more buttons are accessible when the wireless handheld device in either the closed position or open position.

15. The wireless handheld device according to claim 9, wherein the slideable control bar further has a recess on its underside for engaging a snap located adjacent at least one of the top end of the lid, the top end of the lower casing, and the top end of the hinge component for retaining the slideable control bar in position adjacent the hinge component.

16. The wireless handheld device according to claim 9, wherein, when the wireless handheld device is opened, the slideable control bar is adapted to rotate into a position on the facing surface of the lower casing and then slide towards the top end of the lower casing or to rotate into a position on the facing surface of the lid and then slide towards the top end of the lid.

17. A wireless handheld device comprising:
a lower casing having a bottom end and a top end;
a lid having a bottom end and a top end, the top end of the lid being rotatably coupled to the top end of the lower casing with at least one hinge component such that the handheld device is rotatable from a closed position to an open position and from the open position to the closed position, the lid and the lower casing having adjacent facing surfaces when in the closed position; and
a slideable control bar residing adjacent the bottom end of the lid and the bottom end of the lower casing when in the closed position;
wherein, when the wireless handheld device is opened, the slideable control bar is slideable along one of the facing surface of the lower casing towards the top end of the lower casing and the facing surface of the lid towards the top end of the lid;

wherein the facing surface of at least one of the lid and the lower casing is sloped near the bottom end such that the facing surface of at least one of the lid and the lower casing slopes away from the facing surface of the other near the bottom ends of the lid and the lower casing when in a closed position, creating space for the slideable control bar to rest when the wireless handheld device is in the closed position.

18. The wireless handheld device according to claim 17, wherein the slideable control bar includes one or more buttons for accepting one or more inputs, the buttons being accessible when the wireless handheld device is in the closed position and the slideable control bar rests between the lid and the lower casing.

* * * * *